(12) United States Patent
Sa et al.

(10) Patent No.: US 11,465,663 B2
(45) Date of Patent: Oct. 11, 2022

(54) CART ROBOT HAVING CHARGE FUNCTION

(71) Applicant: LG ELECTRONICS INC., Seoul (KR)

(72) Inventors: Jaecheon Sa, Seoul (KR); Sunryang Kim, Seoul (KR); Joohan Kim, Seoul (KR); Keunsik No, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 16/757,930

(22) PCT Filed: May 20, 2019

(86) PCT No.: PCT/KR2019/006021
§ 371 (c)(1),
(2) Date: Apr. 21, 2020

(87) PCT Pub. No.: WO2020/235701
PCT Pub. Date: Nov. 26, 2020

(65) Prior Publication Data
US 2021/0403065 A1    Dec. 30, 2021

(51) Int. Cl.
*B62B 5/00* (2006.01)
*B60L 53/16* (2019.01)
*B62B 3/14* (2006.01)

(52) U.S. Cl.
CPC ............ *B62B 5/0053* (2013.01); *B60L 53/16* (2019.02); *B62B 3/14* (2013.01); *B62B 5/004* (2013.01);
(Continued)

(58) Field of Classification Search
CPC ......... B62B 5/0053; B62B 3/14; B62B 5/004; B62B 5/0059; B62B 2207/00; B62B 5/00;
(Continued)

(56) References Cited

U.S. PATENT DOCUMENTS

| | | | |
|---|---|---|---|
| 6,276,471 B1 * | 8/2001 | Kratzenberg | B62B 5/0026 180/19.1 |
| 2015/0349557 A1 * | 12/2015 | Chen | H02J 7/0018 320/120 |

(Continued)

FOREIGN PATENT DOCUMENTS

| | | | | |
|---|---|---|---|---|
| CN | 203103711 U | * | 7/2013 | .............. H01R 24/68 |
| CN | 103329362 A | * | 9/2013 | .......... H01M 2/1083 |

(Continued)

OTHER PUBLICATIONS

CN-106981168-A (Year: 2022).*

*Primary Examiner* — James A Shriver, II
*Assistant Examiner* — Ian Bryce Shelton
(74) *Attorney, Agent, or Firm* — Birch, Stewart, Kolasch & Birch, LLP

(57) ABSTRACT

Provided is a cart robot having a charge function, which includes: a main body having a container in which goods are contained, a handle assembly installed on one side of the container, a battery module, and a battery management system (BMS) module for managing charge and discharge of the battery module; wheel assemblies rotatably coupled to a lower portion of the main body, and configured to move the main body in a direction of a force applied to the handle assembly; and an external charge module (CM) having a front connector provided on a lower front side of the main body and a rear connector provided on a lower rear side of the main body, electrically connected to an external power supply through the front or rear connector and configured to charge the battery module.

19 Claims, 15 Drawing Sheets

(52) U.S. Cl.
CPC ........ *B62B 5/0059* (2013.01); *B62B 2207/00* (2013.01)

(58) Field of Classification Search
CPC .... B62B 5/0073; B60L 53/16; B60L 2200/40; B60L 50/66; B60L 2200/30; B60L 2200/36; H01M 10/00; Y02T 10/70; Y02T 10/7072; Y02T 90/14; H01R 2201/26
See application file for complete search history.

(56) References Cited

U.S. PATENT DOCUMENTS

| | | | |
|---|---|---|---|
| 2017/0214262 A1* | 7/2017 | Jones | H02J 7/02 |
| 2017/0229903 A1* | 8/2017 | Jones | H02K 7/1846 |
| 2018/0118245 A1* | 5/2018 | Chung | B62B 5/0043 |
| 2018/0244294 A1* | 8/2018 | Ochiai | B62B 5/004 |
| 2018/0366886 A1* | 12/2018 | Chen | H01R 13/713 |
| 2018/0370377 A1* | 12/2018 | Blacksberg | B60L 53/305 |
| 2018/0370554 A1* | 12/2018 | Raza | G07G 1/0081 |
| 2019/0260220 A1* | 8/2019 | Jones | H02K 7/1846 |
| 2020/0127505 A1* | 4/2020 | Kato | G06F 11/3447 |

FOREIGN PATENT DOCUMENTS

| | | | | | |
|---|---|---|---|---|---|
| CN | 204348993 | U | * | 5/2015 | .............. B62B 3/00 |
| CN | 105552673 | A | * | 5/2016 | .......... H01R 13/703 |
| CN | 106981168 | A | * | 7/2017 | |
| CN | 206569113 | U | * | 10/2017 | |
| CN | 107336730 | A | * | 11/2017 | |
| CN | 208393137 | U | * | 1/2019 | |
| DE | 202009009055 | U1 | * | 10/2009 | .............. B62B 5/00 |
| DE | 102017113619 | A1 | * | 12/2018 | |
| GB | 2425294 | A | * | 10/2006 | .......... B62B 3/1404 |
| GB | 2565895 | A | * | 2/2019 | .......... H02J 7/0042 |
| JP | 5-316607 | A | | 11/1993 | |
| JP | 05316607 | A | * | 11/1993 | |
| JP | H11285109 | A | * | 10/1999 | |
| KR | 10-2006-0014750 | A | | 2/2006 | |
| KR | 10-1392992 | B1 | | 5/2014 | |
| KR | 10-2014-0117885 | A | | 10/2014 | |
| KR | 10-2015-0106434 | A | | 9/2015 | |
| KR | 10-2018-0029795 | A | | 3/2018 | |
| WO | WO-0136248 | A1 | * | 5/2001 | .............. B60L 8/003 |
| WO | WO-2014108047 | A1 | * | 7/2014 | .............. H01R 24/68 |
| WO | WO-2018231184 | A1 | * | 12/2018 | |
| WO | WO-2019025968 | A1 | * | 2/2019 | .............. B60L 53/16 |

* cited by examiner

CART ROBOT HAVING CHARGE FUNCTION

CROSS-REFERENCE TO RELATED APPLICATIONS

This application is the National Phase of PCT International Application No. PCT/KR2019/006021 filed on May 20, 2019, the contents of which are hereby expressly incorporated by reference into the present application.

TECHNICAL FIELD

The disclosure relates to a cart robot having a charge function capable of charging the cart robot to provide a user following function and a power assist function.

BACKGROUND ART

Various types of carts are used in order for users to carry heavy goods or loads at big retail stores, department stores, airports, and so on.

Carts used in spaces for shopping such as big retail stores or department stores have a structure in which a plurality of wheels are installed below a basket in which things are put and a user moves the cart by pushing or pulling a handle. Carts prevent users from directly carrying lots of things or heavy things, and thus are products that are necessarily required for convenience of the users.

The users have moved the carts by directly handling them. However, the users often move away from the carts in the process of checking a wide variety of products. In this case, it is inconvenient for the users to go to and move the carts, or carry things to the carts.

There is a need to develop a cart that can remove this inconvenience from the user, follow a position of the user during movement of the user to be automatically moved along the user, or assist power of the user to be easily moved. Especially, to realize the above functions for the cart, since external electric power cannot always be supplied to the cart that is moving, the cart should be essentially provided with a battery and a charge system for charging the battery. However, there is no cart provided with a charge system for the aforementioned user assist functions.

DISCLOSURE

Technical Problem

Various embodiments are directed to providing a cart robot having a charge function capable of charging the cart robot requiring power to realize a user following function and a power assist function.

Also, various embodiments are directed to providing a cart robot having a charge function capable of simultaneously charging a plurality of cart robots at a charge position.

The objects of the present disclosure are not limited to the aforementioned objects, and the other unmentioned objects and advantages of the present disclosure can be understood by the following description, and will be more clearly appreciated by embodiments of the present disclosure. It may be easily appreciated that objects and advantages of the present disclosure may be realized by means mentioned in the claims and a combination thereof.

Technical Solution

In an embodiment, a cart robot includes: a main body having a container in which goods are contained, a handle assembly installed on one side of the container, a battery module, and a battery management system (BMS) module for managing charge and discharge of the battery module; wheel assemblies rotatably coupled to a lower portion of the main body, and configured to move the main body in a direction of a force applied to the handle assembly; and an external charge module having a front connector provided on a lower front side of the main body and a rear connector provided on a lower rear side of the main body, electrically connected to an external power supply through the front or rear connector and configured to charge the battery module, any one of the front and rear connectors being a female connector and the other being a male connector.

In the embodiment, the front connector may be disposed toward a rear connector of another cart robot when the cart robot is coupled with the other cart robot, and include a plurality of first terminals energized when the external power supply is activated, and a plurality of first leaf springs configured to elastically support the first terminals toward the rear connector of the other cart robot.

In the embodiment, the rear connector may be disposed toward a front connector of the other cart robot when the cart robot is coupled with the other cart robot, and include a plurality of second terminals energized when the external power supply is activated, and a plurality of second leaf springs configured to elastically support the second terminals toward the front connector of the other cart robot.

In the embodiment, the front connector and the rear connector may be configured such that the first terminals and the second terminals come into contact with each other and energized when the cart robot is coupled with the other cart robot.

In the embodiment, the front connector may further include a front connecting body coupled on a lower side of the main body, and a first guide rib extending toward the lower side of the main body may be formed on one side of the front connecting body.

In the embodiment, the rear connector may further include a rear connecting body coupled on the lower side of the main body, and a second guide rib extending toward the lower side of the main body may be formed on one side of the rear connecting body.

In the embodiment, the first guide rib and the second guide rib may be inserted into a guide rail of a cart robot guider installed on a floor when the main body is moved at a charge position of the battery module, and be moved along the guide rail.

In the embodiment, a first magnet and a second magnet may be installed on one side of the front connecting body and one side of the rear connecting body, respectively, and be disposed such that magnetic poles attracted to each other are opposite to each other.

In the embodiment, the front connector may include a front connecting body coupled to a lower portion of the main body and having one open side, a plurality of terminals energized when the external power supply is activated, and a connecting lever installed at a lower portion of the front connecting body and configured to rotatably support the terminals.

In the embodiment, the front connecting body may be configured such that a plurality of terminal inserting holes to which the terminals are exposed are formed through the one open side thereof.

In the embodiment, the connecting lever may include a cylindrical rotary support having a hollow, a cylindrical rotary shaft inserted into the hollow, a terminal coupling extending to one side of the rotary support in a radial direction and coupled to the terminals, and a rotator extending to the other side of the rotary support in the radial direction.

In the embodiment, the connecting lever may be configured such that the rotator is bent toward a front of the main body in an "L" shape, is pushed toward a rear of the main body by the rear connector of the other cart robot when the cart robot is coupled with the other cart robot, and rotates about the rotary shaft to expose the terminals to the terminal inserting holes.

Advantageous Effects

According to the embodiments, the cart robot of the present disclosure includes a battery and a charge system, and thereby can provide sufficient power required for the cart robot and easily realize various functions which requires power for user convenience.

Further, charge structures mutually coupled to a plurality of cart robots are equally provided, and thereby the plurality of cart robots can be simultaneously charged only by disposing the plurality of cart robots at a charge position. Consequently, there is an advantage in that charge is simple.

Further, since the cart robots are charged in a state in which the cart robots are disposed to partly overlap each other, there is no need to secure a separate space for charge, and a storage area can be reduced when the cart robots are stored.

The specific effects of the present disclosure along with the aforementioned effects will be described along with the following description of the embodiments for carrying out the present disclosure.

MODE FOR INVENTION

Figure 1:
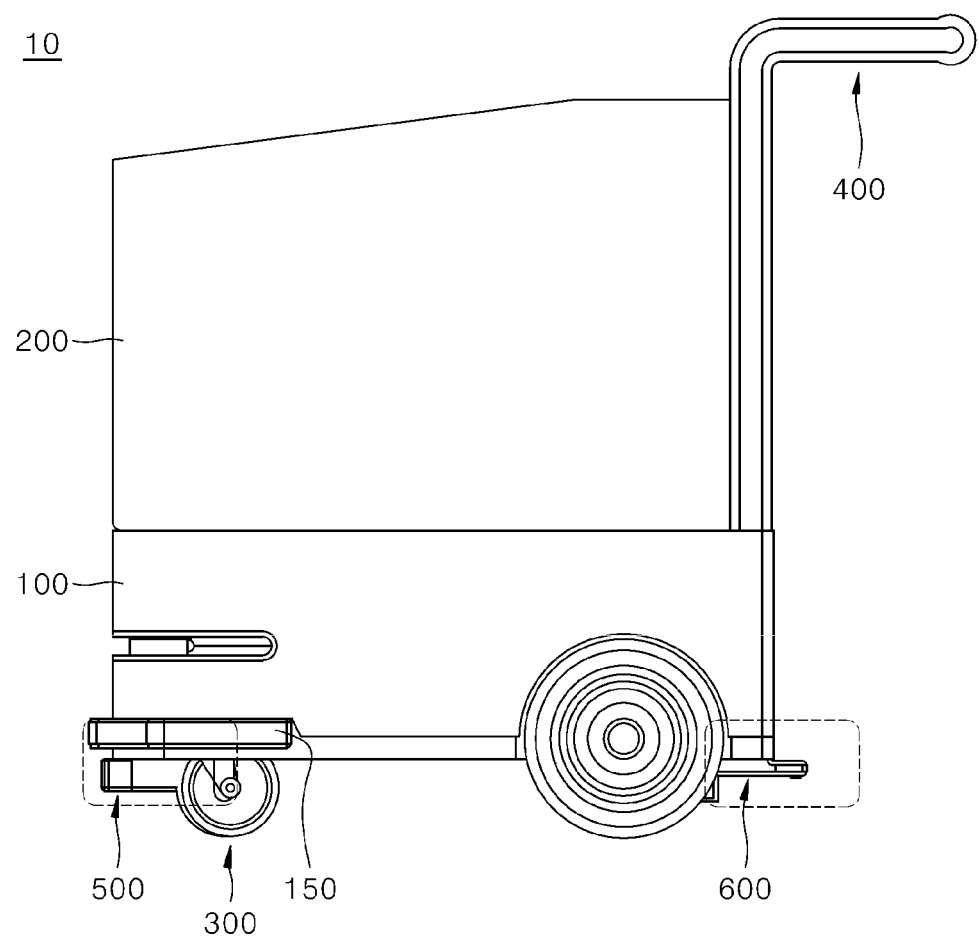
FIG. 1 is a side view illustrating a cart robot according to a first embodiment of the present disclosure.

The foregoing objects, advantages and features of the disclosure will be described below in detail with reference to the accompanying drawings, and thus those skilled in the art to which the disclosure belongs can easily carry out the technical spirit of the disclosure. In the description of the disclosure, when it is determined that the concrete description of the related art would unnecessarily obscure the subject matter of the disclosure, the detailed description thereof will be omitted. Hereafter, preferred embodiments of the disclosure will be described in detail with reference to the accompanying drawings. The same reference signs in the drawings are used to indicate identical or similar components.

Hereinafter, an arbitrary component is disposed at an "upper (or lower) portion" of a component or "above (or below)" of a component, which may mean that the arbitrary component is disposed on an upper (or lower) surface of the component, as well as that another component can intervene between the component and the arbitrary component disposed above (or below) the component.

Further, it should be understood that when component is referred to as being "connected," "coupled" or "joined" to another component, the components can be directly connected, coupled or joined to each other, or another component "intervenes" between components, or the components can be "connected," "coupled" or "joined" through another component.

Hereinafter, "cart robots" refer to devices that are manually moved under control of a user or are moved by electric power. The cart robots may or may not include a function of containing things. The cart robots can be used in shopping spaces such as big retail stores, department stores, or small and medium retail stores, leisure spaces such as golf courses, and movable spaces such as airports or harbors.

Figure 2:
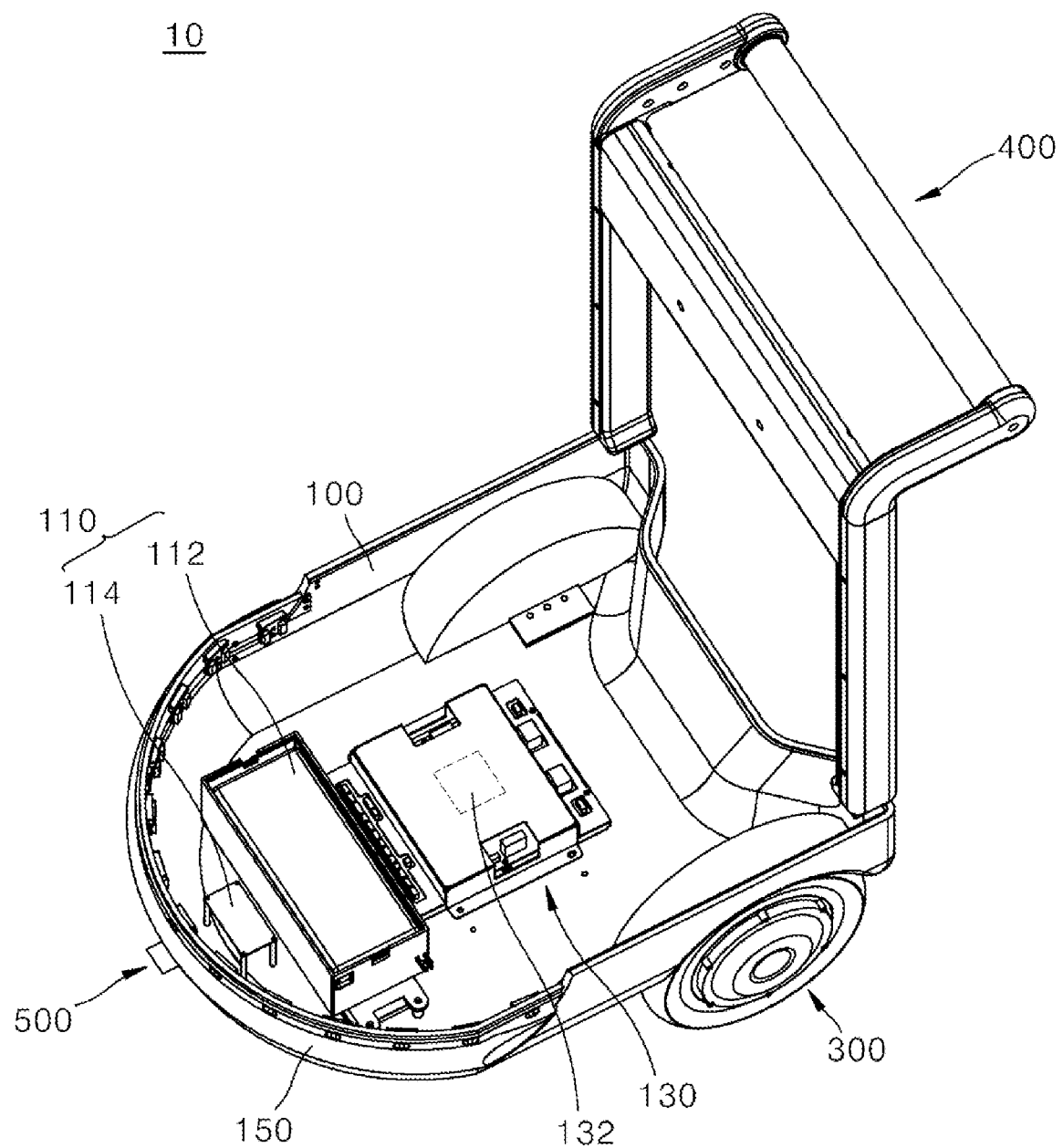
FIG. 2 is a partially exploded perspective view illustrating an interior of a main body of the cart robot illustrated in FIG. 1.
Figure 3:
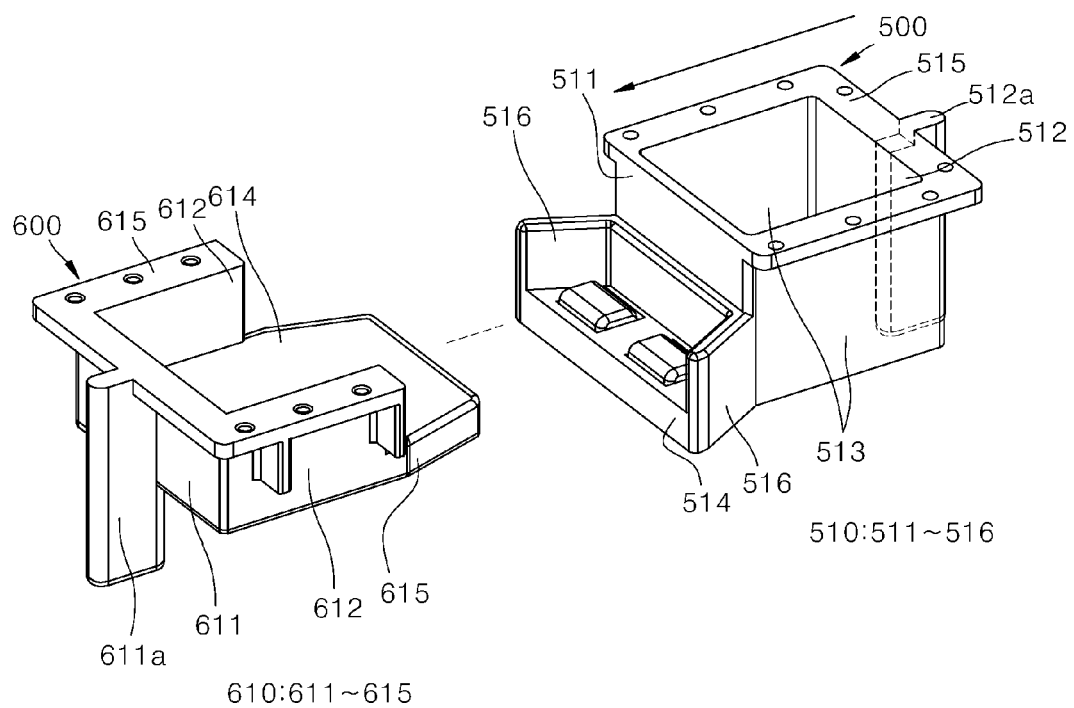
FIG. 3 is a perspective view illustrating an external charge module before coupling in the cart robot of FIG. 1.
Figure 4:
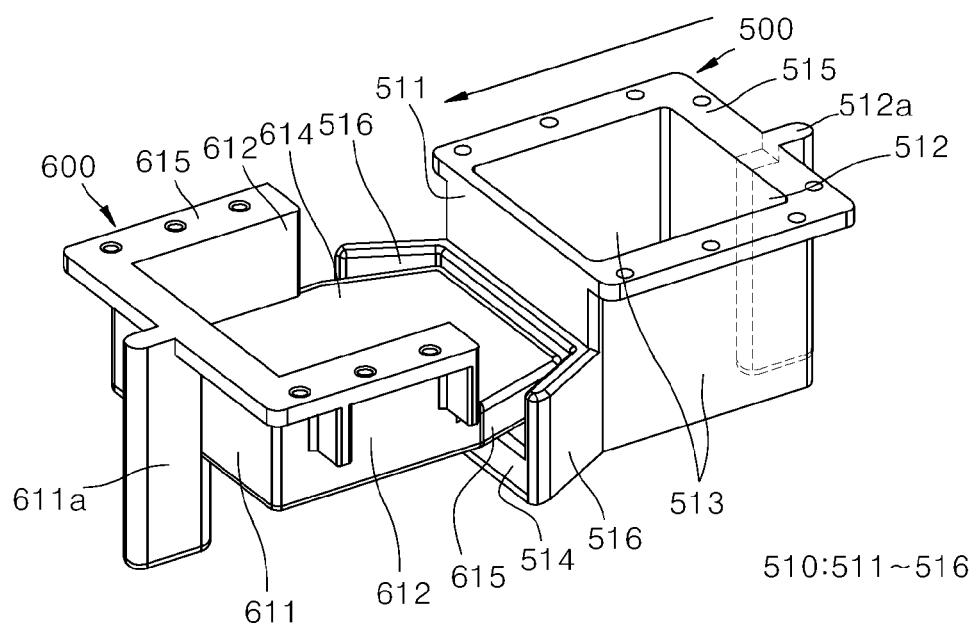
FIG. 4 is a perspective view illustrating the external charge module after coupling in the cart robot of FIG. 3.
Figure 5:
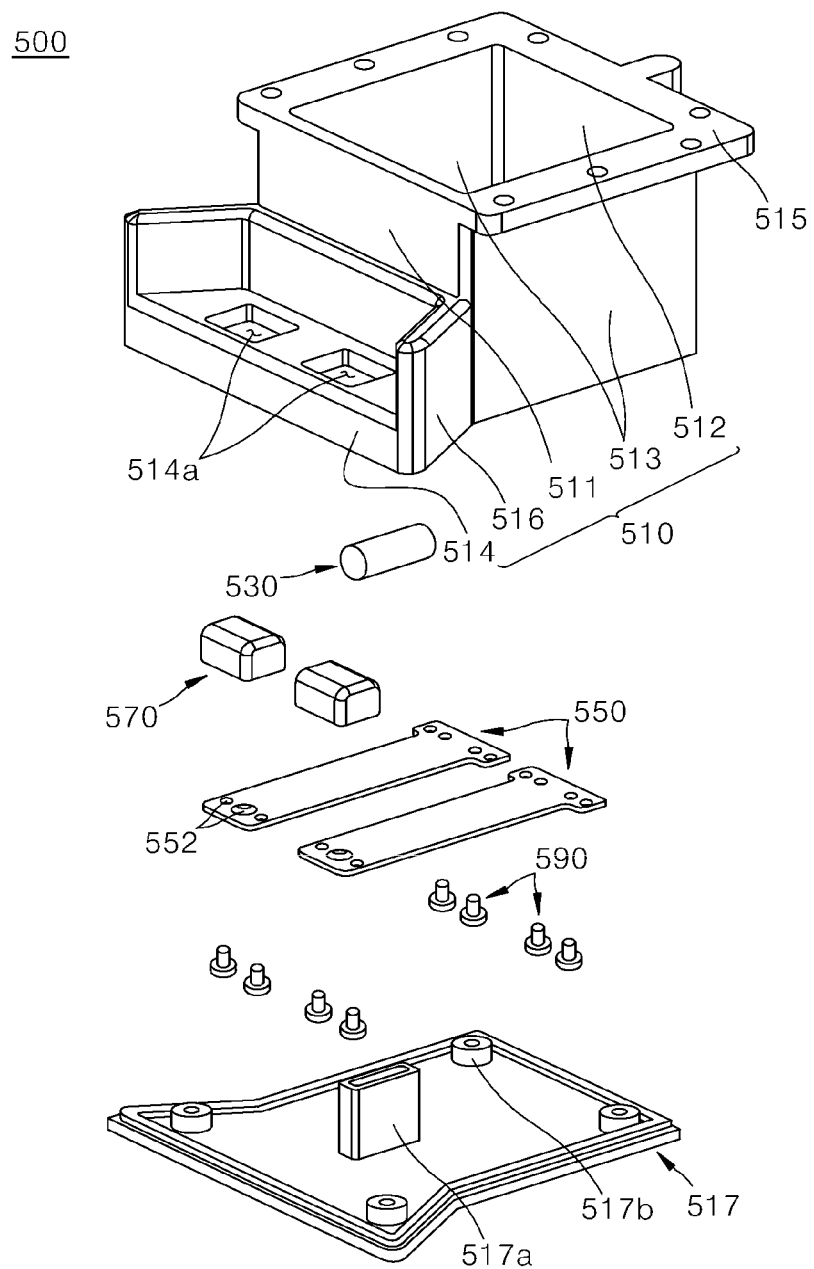
FIG. 5 is an exploded perspective view illustrating a front connector illustrated in FIGS. 3 and 4.
Figure 6:
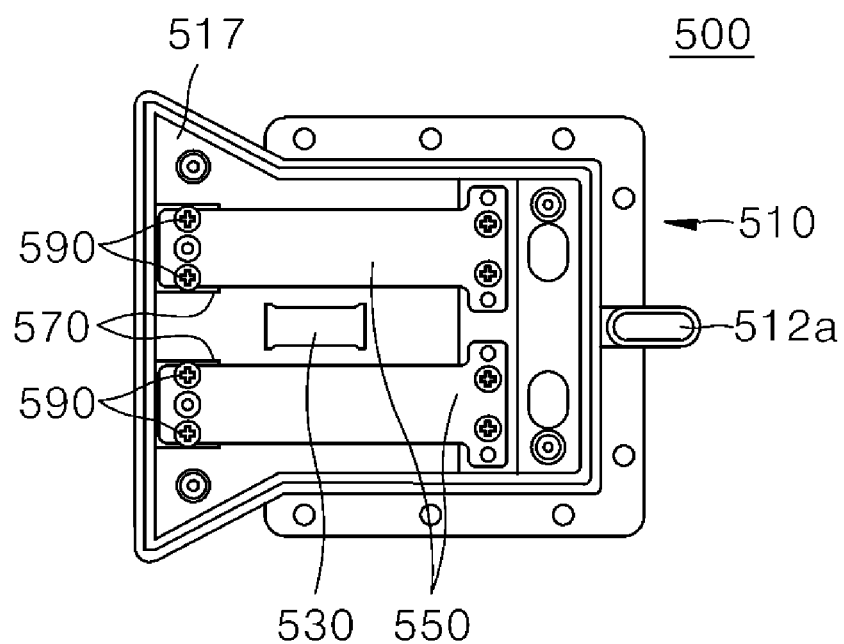
FIG. 6 is a top view illustrating a part of the front connector illustrated in FIG. 5.
Figure 7:
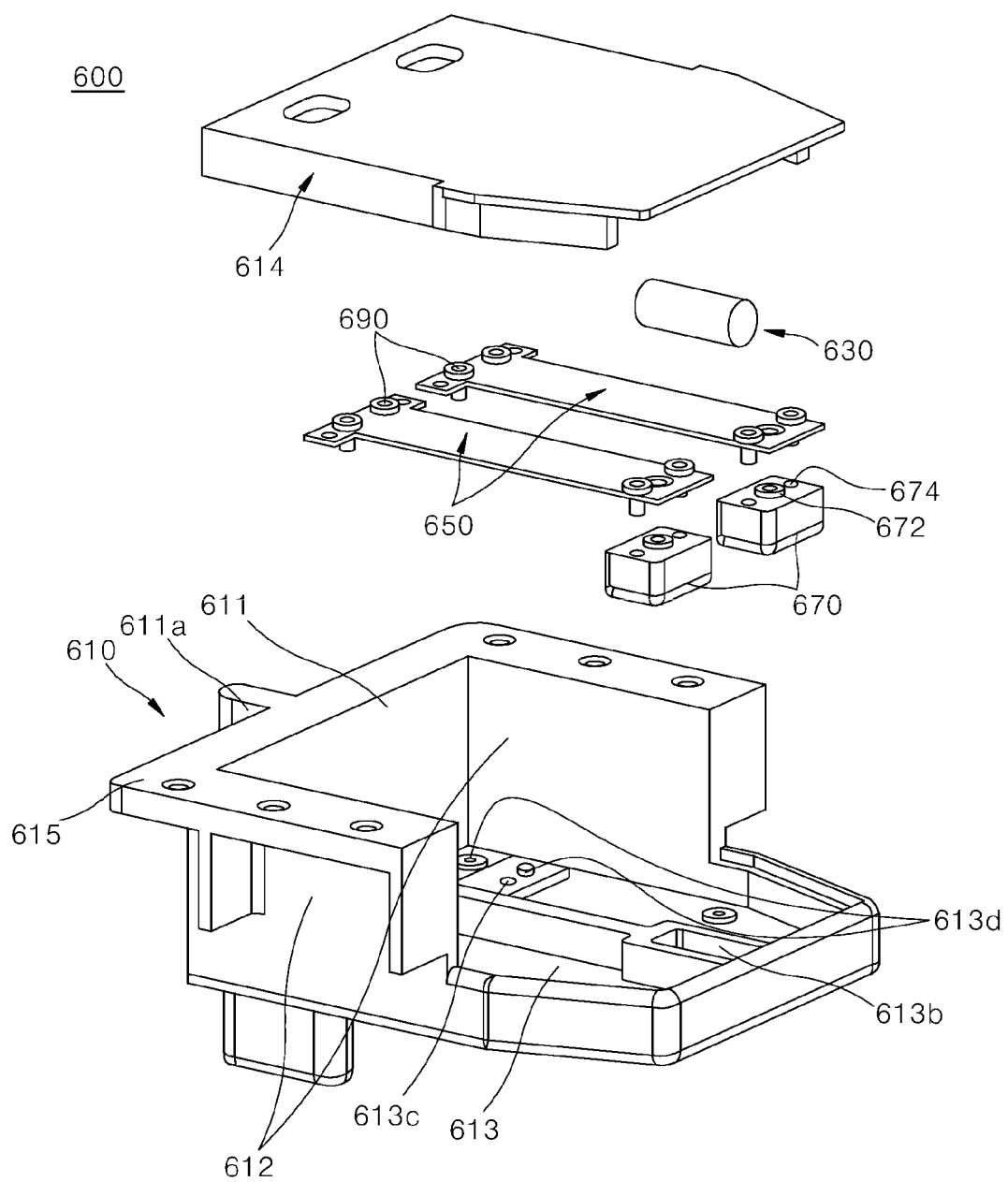
FIG. 7 is an exploded perspective view illustrating a rear connector illustrated in FIGS. 3 and 4.
Figure 8:
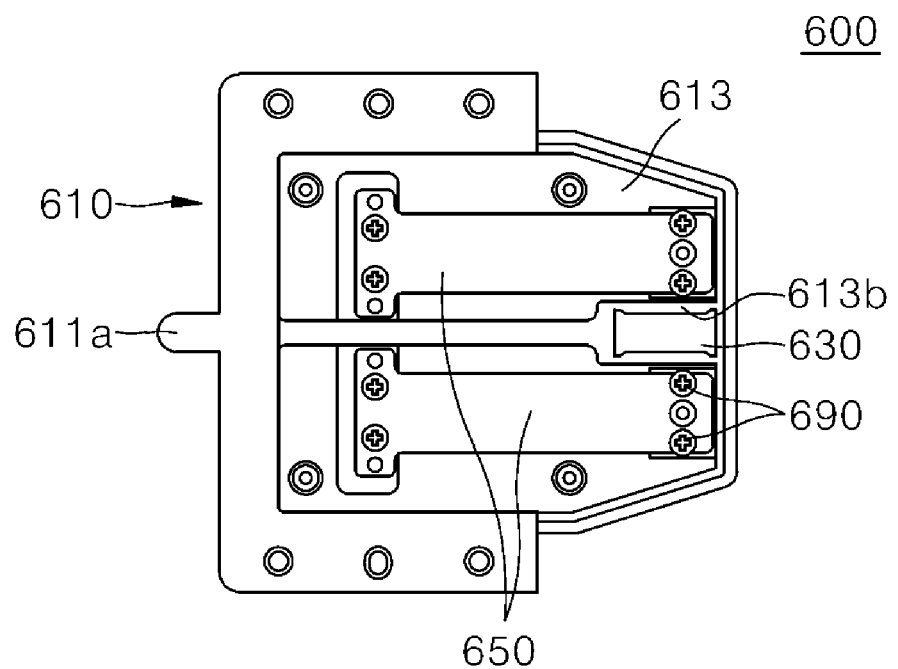
FIG. 8 is a top view illustrating a part of the rear connector illustrated in FIG. 7.
Figure 9:
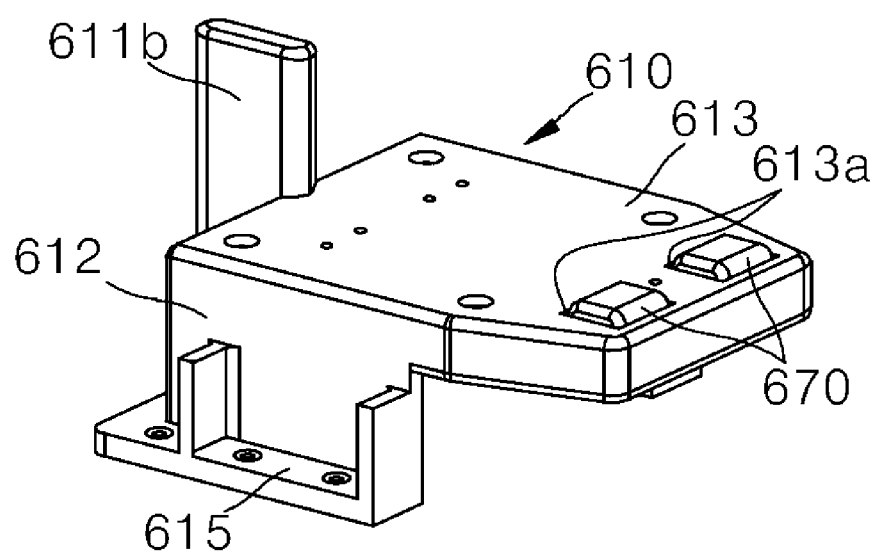
FIG. 9 is a rear perspective view illustrating the rear connector illustrated in FIG. 7.
Figure 10:
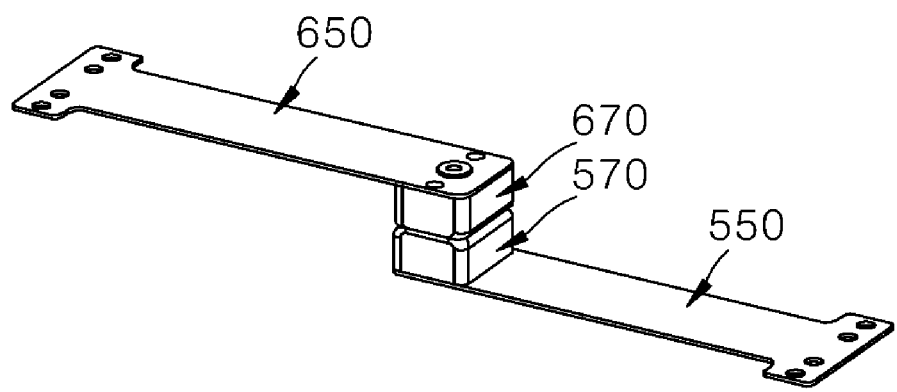
FIG. 10 is a perspective view illustrating a terminal contact state when the external charge module illustrated in FIGS. 5 and 7 is coupled.
Figure 11:
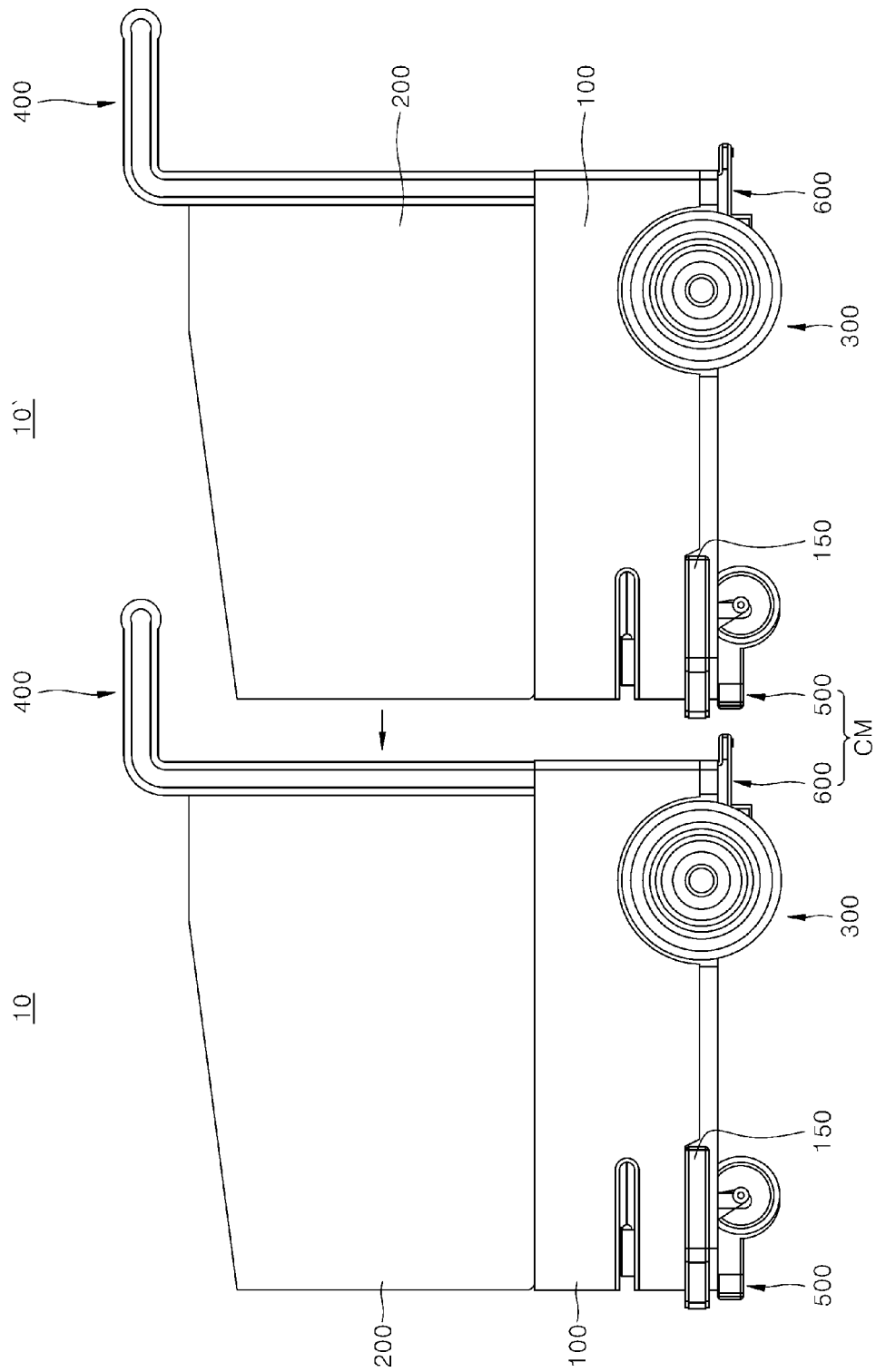
FIG. 11 is a side view illustrating a state before the external charge module is connected when a plurality of cart robots according to the first embodiment of the present disclosure are connected.
Figure 12:
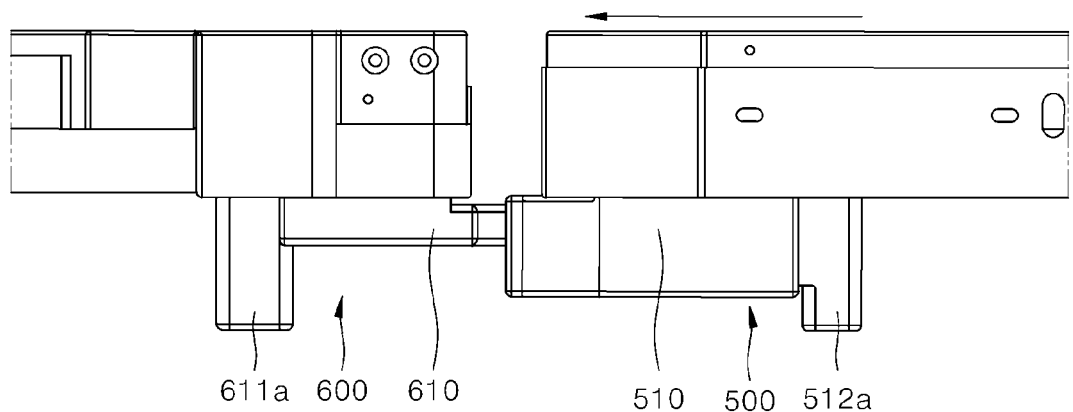
FIG. 12 is a side view illustrating a state after the external charge module illustrated in FIG. 11 is connected.
Figure 13:
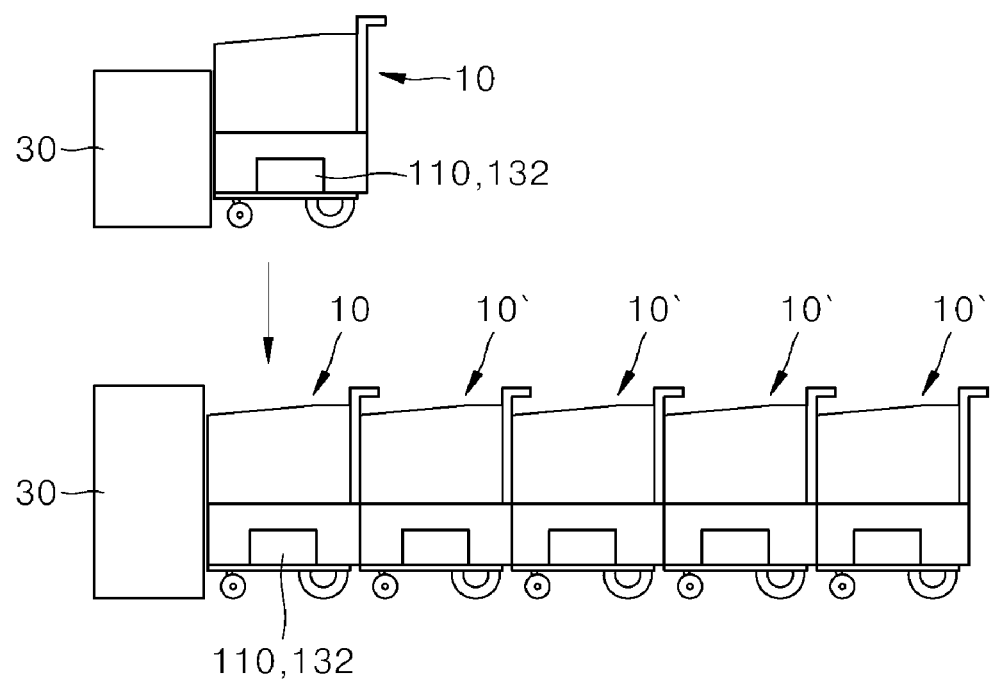
FIG. 13 is a schematic view illustrating arrangement of the cart robots illustrated in FIG. 11 at a charge position.

FIG. 1 is a side view illustrating a cart robot according to a first embodiment of the present disclosure. FIG. 2 is a partially exploded perspective view illustrating an interior of a main body of the cart robot illustrated in FIG. 1. FIG. 3 is a perspective view illustrating an external charge module before coupling in the cart robot of FIG. 1. FIG. 4 is a perspective view illustrating the external charge module after coupling in the cart robot of FIG. 3. FIG. 5 is an exploded perspective view illustrating a front connector illustrated in FIGS. 3 and 4. FIG. 6 is a top view illustrating a part of the front connector illustrated in FIG. 5. FIG. 7 is an exploded perspective view illustrating a rear connector illustrated in FIGS. 3 and 4. FIG. 8 is a top view illustrating a part of the rear connector illustrated in FIG. 7. FIG. 9 is a rear perspective view illustrating the rear connector illustrated in FIG. 7. FIG. 10 is a perspective view illustrating a terminal contact state when the external charge module illustrated in FIGS. 5 and 7 is coupled. FIG. 11 is a side view illustrating a state before the external charge module is connected when a plurality of cart robots according to the first embodiment of the present disclosure are connected. FIG. 12 is a side view illustrating a connected state of the external charge module illustrated in FIG. 11. FIG. 13 is a schematic view illustrating arrangement of the cart robots illustrated in FIG. 11 at a charge position. In the description of the present disclosure, a direction in which a handle assembly is installed is defined as a rear of the cart robot, and a direction opposite thereto is defined as a front of the cart robot.

As illustrated in FIGS. 1 and 2, a cart robot 10 according to a first embodiment of the present disclosure includes a main body 100, a container 200 provided on an upper side of the main body 100, a plurality of wheel assemblies 300 coupled at a lower portion of the main body 100, and a handle assembly 400 coupled in the rear of the main body 100.

Various parts are installed in the main body 100, and goods are contained in the container 200. A user pushes or pulls the handle assembly 400, and thereby can move the cart robot 10 forward or backward.

Various sensors or parts for following a position of the user or assisting a force which the user applies to the cart robot 10 may be mounted in the main body 100. In order to supply power to these parts, a battery module 110 and a main printed circuit board (PCB) module 130 having a main PCB for controlling these parts may be provided in the main body 100. A bumper 150 for protecting various sensors and parts in the main body 100 may be provided outside the main body 100 to surround a lower side of the main body 100. The bumper 150 may be located in the front of the main body 100, and be made of an elastic material having a prescribed thickness to be able to prevent an impact at the time of collision of the cart robot 10.

Although not illustrated in the drawings, the cart robot 10 of the present disclosure may provide a function of avoiding an obstacle, a function of following a user, and a function of assisting power, using various sensors.

For example, the cart robot 10 may have a time-of-flight (TOF) sensor that is a photosensor, and detect product stands that are obstacles fixed in a place such as a retail store. In the case of the product stands, heights or sizes thereof may be different, but heights of lower stages thereof are all designed to be constant, and thus a function of detecting, by the cart robot 10, the lower stages of the product stands and avoiding the obstacles can be provided by using the TOF sensor.

The TOF sensor is a sensor that employs a time-of-flight distance measurement system and calculates a distance by measuring a time which it takes for light to be emitted from a light source toward a subject and then be reflected to return to the sensor. When the TOF sensor is used along with a camera, an object can be expressed or detected in three dimensions. The TOF sensor has an advantage in that it is simple in sensing process and control and has an excellent recognition rate even in a bright environment because it does not interfere in external light. Therefore, the cart robot 10 can automatically avoid an obstacle to move along a user when performing a function of automatically following a position of the user.

In a case in which a lidar sensor is mounted separately from the TOF sensor, the cart robot 10 may detect moving people separately from fixed obstacles such as product stands, and avoid people.

The lidar sensor is a sensor that measures a distance from the sensor to a detecting target by measuring a time which it takes for a laser beam to be emitted to the detecting target, to be reflected from the detecting target, and to return to the sensor again. The lidar sensor has an advantage in that it has very high positional precision and enables detection at an angle of 360 degrees because it uses the laser beam. Since areas or mobile obstacles that are not detected by the TOF sensor can be distinguished and detected using the lidar sensor, precise obstacle avoidance and movement of the cart robot 10 are feasible.

Further, the cart robot 10 may be provided with a positioning sensor and camera of an ultra-wideband (UWB) type, and follow a position of a transmission module provided to a user to automatically move. A function of automatically moving, by the cart robot 10, along the user according to movement of the user having the transmission module is defined as an "automatic following" function or a "user following" function. The positioning sensor tracks the position of the transmission module owned by the user, and a detected result of the positioning sensor is transmitted to a control PCB or a main PCB of the positioning sensor. The control PCB or the main PCB detection may track a position of the user on the basis of the detected result of the positioning sensor, and automatically move the cart robot 10.

The cart robot 10 may provide a driving force for automatic movement when the user following function is driven and an auxiliary force when the user moves the cart robot 10. In-wheel motors are provided inside the respective wheel assemblies 300 of the cart robot 10. The in-wheel motors may be supplied with electric power from the battery module 110, and drive the wheel assemblies 300.

The auxiliary force is provided to add an additional force when the user moves the cart robot 10 by the in-wheel motors, or the driving force by which the cart robot 10 moves automatically when the user following function is driven is provided.

Especially, when the auxiliary force is provided when the user moves the cart robot 10, the additional force is added in a direction in which the user applies a force, and thus the user can easily move the cart robot 10. A function of providing the auxiliary force required for the movement of the cart robot 10 in this way is defined as a "power assist" function.

The cart robot 10 of the present disclosure is supplied with power from the battery module 110 in order to provide the obstacle avoidance function, the user following function, and the power assist function. Since the battery module 110 has a battery with a limited capacity, the battery module 110 should be supplied with external power and be charged.

To this end, an external charge module (CM) for charging the battery module 110 is provided outside the main body 100. The battery module 110 is charged through the external CM, and supplies the power to where power is required in the cart robot 10. The external CM is installed at a position at which the bumper 150 does not interfere in coupling when the plurality of cart robots 10 are connected, which will be described below.

As illustrated in FIG. 2, the battery module 110 is disposed on an inner bottom of the main body 100. The battery module 110 is made up of a battery 112, a PCB for the battery (not illustrated), and a battery case 114 in which the battery 112 is housed. Both the battery 112 and the battery case 114 are detachably coupled.

Although not illustrated in the drawings, the PCB for the battery includes a charge circuit for charging the battery 112, and a communication means. The PCB for the battery communicates with a battery management system (BMS) module 132 on a main PCB 152, and charge and discharge are controlled by the BMS module 132. The BMS module 132 may be provided on the main PCB or the battery module 110. Alternatively, the BMS module 132 may be separately provided adjacent to the battery module 110, and be configured to communicate with the battery module 110 and the main PCB.

The BMS module 132 may check a charge amount and a discharge amount of the battery 112, and calculate a residual amount, an operable time, a time required for charge, etc. of the battery 112. The BMS module 132 may perform control by distinguishing when the battery 112 is in an "operation mode" and when the battery 112 is in a "charge mode." In addition, the BMS module 132 may perform control by distinguishing when one cart robot 10 is charged and when a plurality of cart robots 10 are interconnected and charged.

For example, when the battery 112 is in the "operation mode," the BMS module 132 may detect a used amount of the battery 112 in real time, and calculate a residual operable time of the battery 112 to transmit the calculated residual operable time to a controller provided on the main PCB. The residual operable time, a notification for charge, etc. of the battery 112 may be displayed in real time on a small display device (not illustrated) provided on the cart robot 10.

When the battery 112 is in the "charge mode," the BMS module 132 may determine whether only the single cart robot 10 is disposed at a charge position or another cart robot 10 is connected thereto. The BMS module 132 is provided in all the cart robots 10, and has a communication function. Therefore, the BMS module 132 of each cart robot 10 may communicate with the BMS module 132 of the other cart robot 10, or the controller of the main PCB. As a result, it may be determined whether only the single cart robot 10 is located at a charge position or whether the numerous cart robots 10 are being charged at the same time.

In the "charge mode" of the battery 112, the BMS module 132 may determine according to the residual amount of the battery 112 whether to preferentially charge the cart robot 10 in which the BMS module 132 is installed, or whether to transmit power to the other cart robot 10 in order to preferentially charge the battery 112 of the other cart robot 10.

All the battery modules 110 provided in the respective cart robots 10 have the same structure and are controlled by the same method, and all the external CMs also have the same structure. Hereinafter, the structure of the external CM will be described first in detail on the basis of one cart robot 10.

As illustrated in FIGS. 3, 4 and 11 to 13, the external CM includes a front connector 500 that is provided on a lower front side of the cart robot 10, and a rear connector 600 that is provided on a lower rear side of the cart robot 10. The front connector 500 and the rear connector 600 may be coupled in a male/female coupling structure. To this end, any one of the front connector 500 and the rear connector 600 may have a concave coupling part and the other may have a convex coupling part. The front connector 500 and the rear connector 600 are disposed on the same straight line when viewed on the basis of the main body 100 of the cart robot 10.

As illustrated in FIGS. 3 to 6, the front connector 500 includes a front connecting body 510 that is coupled on the lower front side of the cart robot 10, and a first magnet 530, first leaf springs 550, a plurality of first terminals 570, and a plurality of first fastening members 590 that are inserted into the front connecting body 510.

The front connecting body 510 includes a first front wall 511 that faces the front of the cart robot 10, a first rear wall 512 that is opposite to the first front wall 511, and a pair of first sidewalls 513 that are interposed between the first front wall 511 and the first rear wall 512. A terminal coupling 514 on which the first terminals 570 coming into contact with the rear connector 600 are installed is formed on a front lower side of the first front wall 511. A pair of guide sidewalls 516 for guiding the rear connector 600 are formed on opposite sides of the terminal coupling 514. The first front wall 511, the first rear wall 512, and the first sidewalls 513 are connected to one another, and a main body coupling 515 coupled with the main body 100 of the cart robot 10 is provided on upper ends thereof. A first lower cover 517 is coupled to lower ends of the walls.

The first front wall 511, the first rear wall 512, and the first sidewalls 513 are each shaped of a quadrilateral plate, and are mutually connected to have a quadrilateral cross-section. These walls are connected to form a hexahedral shape whose upper side is open and whose lower side is closed by the first lower cover 517. The aforementioned main body coupling 515 is formed on the opened upper end of the hexahedral shape. A first guide rib 512a for guiding a position of the cart robot 10 at a charge position, to be described below, is formed on the first rear wall 512 in a projected shape.

The first guide rib 512a is disposed in a height direction of the first rear wall 512 so as to be perpendicular to an outer surface of the first rear wall 512. The first guide rib 512a is formed with a prescribed width in a projected shape. Further, since the first guide rib 512a has a longer length than a height of the first rear wall 512, the first guide rib 512a protrudes downward from the first rear wall 512 (see FIG. 20).

The main body coupling 515 is formed on the upper ends of the first front wall 511, the first rear wall 512, and the first sidewalls 513 to have a prescribed width. A plurality of holes are formed to pass through the main body coupling 515. Fastening means such as bolts are inserted into the plurality of holes, and thereby the main body coupling 515 can be coupled to a lower end of the main body 100 of the cart robot 10.

The terminal coupling 514 is formed to extend from a lower end of the first front wall 511 toward the front of the cart robot 10 in a prescribed size. The terminal coupling 514 extends parallel to the first lower cover 517. A plurality of terminal inserting holes 514a are formed to pass through the terminal coupling 514. The terminal inserting holes 514a are formed to correspond to the number of first terminals 570 and shapes and positions of the first terminals 570. The guide sidewalls 516 are formed on opposite ends of the terminal coupling 514.

The guide sidewalls 516 are formed to have a lower height than the first front wall 511, and are disposed to expand outward from the first front wall 511 toward the front of the cart robot 10. The guide sidewalls 516 may be provided on the opposite sides of the terminal coupling 514, or integrally formed on the terminal coupling 514 in a "C" shape. When the front connector 500 is coupled with the rear connector 600, the guide sidewalls 516 serves to guide the rear connector 600 to be inserted into the terminal coupling 514.

Even if the guide sidewalls 516 are disposed to be parallel to the first sidewalls 513 instead of expanding outward, the guide sidewalls 516 can guide a coupled position of the rear connector 600. However, this may cause inconvenience in that a user should move the cart robot 10 several times in order to fit the coupled position in the case where unbalanced sliding motion occurs when the user moves the cart robot 10. Therefore, when the guide sidewalls 516 are formed to expand outward from the first front wall 511 toward the front of the cart robot 10, this has an advantage in that the rear connector 600 can be easily inserted into the guide sidewalls 516. To this end, the guide sidewalls 516 are formed to expand outward. Therefore, the terminal coupling 514 connected to the guide sidewalls 516 can have a trapezoidal shape on the basis of the shape of the guide sidewalls 516.

The first lower cover 517 supports lower ends of the first front wall 511, the first rear wall 512, and the first sidewalls 513 and a lower end of the terminal coupling 514 to form a lower surface of the front connecting body 510. A magnet support 517a is formed on an upper surface of the first lower cover 517. Further, a plurality of fastening bosses 517b coupled to the lower ends of the first front wall 511, the first rear wall 512, and the first sidewalls 513 and the lower end of the terminal coupling 514 are formed on the upper surface of the first lower cover 517.

The magnet support 517a is a portion to which the first magnet 530, used to make a coupling force strong when the front connector 500 and the rear connector 600 are coupled, is coupled. The magnet support 517a may include a recess which is formed on the upper surface of the first lower cover 517 and into which the first magnet 530 is inserted.

As illustrated in FIGS. 5 and 6, the first magnet 530 is inserted into the magnet support 517a of the first lower cover 517. The first magnet 530 is coupled with a second magnet 630, formed on the rear connector 600, by magnetic attraction, thereby enhancing a coupling force between the front connector 500 and the rear connector 600. To this end, the first magnet 530 is installed at a position at which attraction can act on the second magnet 630 when the front connector 500 is coupled with the rear connector 600. Therefore, the magnet support 517a is formed at a position at which this position is taken into account. Further, since the first magnet 530 and the second magnet 630 should be attracted to each other, the first magnet 530 is disposed such that magnetic poles thereof different from those of the second magnet 630 face the second magnet 630. The pair of first leaf springs 550 and the first terminals 570 are disposed with the first magnet 530 interposed therebetween.

As illustrated in FIGS. 5, 6 and 10, the first leaf springs 550 are provided in a pair, and elastically support the first terminals 570 of the front connector 500 under the first terminals 570. The first leaf springs 550 support the first terminals 570 such that contact between the terminals 570 and 670 can be maintained when the front connector 500 and the rear connector 600 are coupled. The number of first leaf springs 550 may vary according to the number of first terminals 570.

One ends of the first leaf springs 550 may be coupled to a coupling structure (not illustrated) provided inside the front connecting body 510. A plurality of holes 552 into which the first fastening members 590 such as bolts are inserted may be formed to pass through one ends of the first leaf springs 550. The other ends of the first leaf springs 550 support the first terminals 570 in a state in which one ends of the first leaf springs 550 are fixed by the first fastening members 590. The first terminals 570 are coupled to upper surfaces of the other ends of the pair of first leaf springs 550 by the first fastening members 590 such as bolts. Since the first leaf springs 550 support the first terminals 570 under the first terminals 570, a restoring force acts in a direction in which the first leaf springs 550 push up the first terminals 570.

As illustrated in FIGS. 3 and 5, the first terminals 570 are portions that are exposed to the aforementioned terminal inserting holes 514a and come into contact with the terminals 670 of the rear connector 600. Since the first terminals 570 are energized terminals, the first terminals 570 may be electrically connected to a circuit or electric wires for the external CM directly or indirectly through the first leaf springs 550.

According to the above structure, the front connector 500 is configured such that upper sides of the first terminals 570 are partly exposed to the terminal coupling 514. In contrast, the rear connector 600 is configured such that lower sides of the second terminals 670 are partly exposed. Therefore, when the front connector 500 and the rear connector 600 are coupled, the first terminals 570 and the second terminals 670 may come into contact with each other.

As illustrated in FIGS. 7 to 9, the rear connector 600 includes a rear connecting body 610 that is coupled on the lower rear side of the cart robot 10, and the second magnet 630, second leaf springs 650, the plurality of second terminals 670, and a plurality of second fastening members 690 that are inserted into the rear connecting body 610.

The rear connecting body 610 includes a second front wall 611 and a pair of second sidewalls 612 that are formed in a "C" shape, a second lower wall 613 that is disposed at lower portions of the second front wall 611 and the second sidewalls 612, a second lower cover 614 that is coupled to an upper portion of the second lower wall 613, and a main body coupling 615 that is formed on upper ends of the second front wall 611 and the second sidewalls 612.

The second front wall 611 is a wall that faces the front of the cart robot 10, and the second sidewalls 612 are walls that are connected to opposite sides of the second front wall 611. The second front wall 611 and the second sidewalls 612 are each shaped of a quadrilateral plate, and integrally connected to have a "C" shape. Therefore, a rear side of the second front wall 611 is open. The main body coupling 615 is formed along the upper ends of the second front wall 611 and the second sidewalls 612, and is coupled to the main body 100 of the cart robot 10. The main body coupling 615 performs the same function as the main body coupling 515 of the front connector 500, and thus detailed description thereof will be omitted.

A second guide rib 611a is formed on an outer surface of the second front wall 611 in a projected shape.

As illustrated in FIGS. 7 and 9, the second guide rib 611a is disposed in a height direction of the second front wall 611 so as to be perpendicular to the outer surface of the second front wall 611. The second guide rib 611a is formed with a prescribed width in a projected shape. Further, since the second guide rib 611a has a longer length than a height of the second front wall 611, the second guide rib 611a protrudes downward from the second front wall 611 (see FIGS. 19 and 20).

As illustrated in FIGS. 7 and 9, the second lower wall 613 is formed at the lower portions of the second front wall 611 and the second sidewalls 612, and forms a housing space at a prescribed height, and the second lower cover 614 covers an upper side thereof. One end of the second lower wall 613, facing the rear of the cart robot 10, protrudes to be longer than the second sidewalls 612. The one end of the second lower wall 613 has a shape corresponding to the shapes of the terminal coupling 514 and the guide sidewalls 516 of the front connector 500.

Since the second terminals 670 protrude downward from the one end of the second lower wall 613 and come into contact with the first terminals 570, the one end of the second lower wall 613 has to be able to be inserted into the terminal coupling 514 of the front connector 500. To this end, the one end of the second lower wall 613 has the shape corresponding to the shapes of the terminal coupling 514 and the guide sidewalls 516 of the front connector 500, and terminal inserting holes 613a are formed to pass through the one end of the second lower wall 613.

Further, a magnet housing 613b, a plurality of fastening holes 613c, and a plurality of coupling protrusions or bosses 613d are formed in the housing space defined by the second lower wall 613. The second magnet 630, the second leaf springs 650, the second terminals 670, and the second fastening members 690 are also housed in the housing space. The plurality of fastening holes 613c and the plurality of coupling protrusions or bosses 613d are structures for coupling the second leaf springs 650.

As in FIG. 9, the terminal inserting holes 613a are formed adjacent to the one end of the second lower wall 613. The terminal inserting holes 613a may be formed to correspond to sizes and positions of the second terminals 670 and the number of second terminals 670.

As illustrated in FIGS. 7 and 8, the magnet housing 613b is formed on an upper surface of the second lower wall 613, and has a housing recess that houses the second magnet 630. The second magnet 630 is inserted into the magnet housing 613b. As described above, since the first magnet 530 and the second magnet 630 have to be able to have an influence on each other by attraction when the front connector 500 and the rear connector 600 are coupled, a position of the magnet housing 613b is determined in consideration of this position. Since the second magnet 630 has the same feature as the first magnet 530, the detailed description thereof will be omitted. The second leaf springs 650 are coupled on the second lower wall 613 with the magnet housing 613b interposed therebetween.

As illustrated in FIGS. 7, 8 and 10, the pair of second leaf springs 650 are configured such that one ends thereof are coupled to the second lower wall 613 by the second fastening members 690 and the other ends thereof are coupled to the second terminals 670. The second leaf springs 650 elastically support the second terminals 670 on upper sides of the second terminals 670. Through-holes are formed in the other ends of the second leaf springs 650, and are coupled with the second terminals 670 by the second fastening members 690.

As illustrated in FIGS. 7 and 9, a plurality of holes 674 into which the second fastening members 690 are inserted are formed in upper surfaces of the second terminals 670, and a plurality of protrusions 672 inserted into the second leaf springs 650 may be formed in a projected shape. In a state in which the protrusions 672 are inserted into the second leaf springs 650, the second leaf springs 650 and the second terminals 670 may be coupled by the second fastening members 690. Although not illustrated in the drawings, the first terminals 570 may also be coupled with the first leaf springs 550 in the same coupling structure as the second terminals 670. Since an electrical connecting structure of the second terminals 670 is the same as the first terminals 570, the detailed description thereof will be omitted.

As illustrated in FIG. 7, the second lower cover 614 is formed in a shape corresponding to the shape of the second lower wall 613. The second lower cover 614 covers the upper side of the second lower wall 613 in a state in which all of the second magnet 630, the second leaf springs 650, and the second terminals 670 are coupled, and prevent the second magnet 630, the second leaf springs 650, and the second terminals 670 from being exposed to the outside.

The front connector 500 is mounted on the front lower side of the cart robot 10, and the rear connector 600 is mounted on the rear lower side of the cart robot 10. Therefore, the single cart robot 10 includes the single front connector 500 and the single rear connector 600, both of which are defined as the external CM.

When one cart robot 10 overlaps another cart robot 10', the front cart robot 10 is defined as a first cart robot 10, and the rear cart robot 10' is defined as a second cart robot 10'. In this case, as in FIG. 11, the second cart robot 10' is moved toward the first cart robot 10 in an arrow direction. In this case, the rear connector 600 of the first cart robot 10 and the front connector 500 of the second cart robot 10' are coupled to each other as in FIG. 12, and the first terminals 570 and the second terminals 670 come into contact with each other as in FIG. 10 (for the sake of convenience, the bumper is not illustrated in FIG. 12 to show a coupling relationship of the external CM). The first terminals 570 are supported under the first leaf springs 550 by the first leaf springs 550, and the second terminals 670 are supported on the second leaf springs 650 by the second leaf springs 650. Therefore, since the first terminals 570 and the second terminals 670 are elastically supported in a direction in which they approach each other, the first terminals 570 and the second terminals 670 can be closely coupled to each other when the rear connector 600 of the first cart robot 10 and the front connector 500 of the second cart robot 10' are coupled to each other.

Meanwhile, the bumper 150 is provided in the front of each cart robot 10, and thus each cart robot 10 has a spaced interval by a thickness of the bumper 150. Therefore, despite the spaced interval caused by the bumper 150, the rear connector 600 of the first cart robot 10 and the front connector 500 of the second cart robot 10' have to be able to be coupled to each other. To this end, the rear connector 600 is formed to protrude toward the rear of the cart robot 10 in consideration of the spaced interval caused by the bumper 150, and the front connector 500 is also formed such that the terminal coupling 514 protrudes toward the front of the cart robot 10.

As illustrated in FIG. 13, when there is a need to charge the battery 112 of the cart robot 10, a user or a manager can move the cart robot 10 to a charge position. A power supply or a charger 30 may be separately provided at the charge position. Although not illustrated in the drawing, a terminal structure that can be connected to the front connector 500 is provided on the power supply or the charger 30, is connected to the battery module 110 of the cart robot 10, and can charge the battery module 110. Control related to charging is performed by the BMS module 132 of the cart robot 10.

Further, as in FIG. 13, when a plurality of cart robots 10 are to be charged, the plurality of cart robots 10 may be electrically connected to the single power supply or charger 30 by connecting the external CMs. In this case, the BMS modules 132 of the cart robots 10 and 10' may communicate with each other, and transmit information about charge amounts, discharge amounts, charge times of the batteries 112, positions of the cart robots 10 and 10', etc. to the main PCB modules 130 of the cart robots 10 and 10'. Through this communication, the BMS modules 132 and the main PCB modules 130 of the cart robots 10 and 10' may perform control, for example, preferentially charge the rear cart robot 10' when a charge amount of the front cart robot 10 is high, change the charge order according to residual amounts of the batteries 112 of the cart robots 10 and 10', or the like.

The external CM having the aforementioned structure may be realized in other forms as follows. An external CM according to another embodiment of the present disclosure will be described below with reference to the drawings. The form of a rear connector in a second embodiment is the same as in the first embodiment, and thus only a front connector will be described. Further, the same components as in the first embodiment will be described with reference to the reference signs of the first embodiment, and the detailed description thereof will be omitted.

Figure 14:
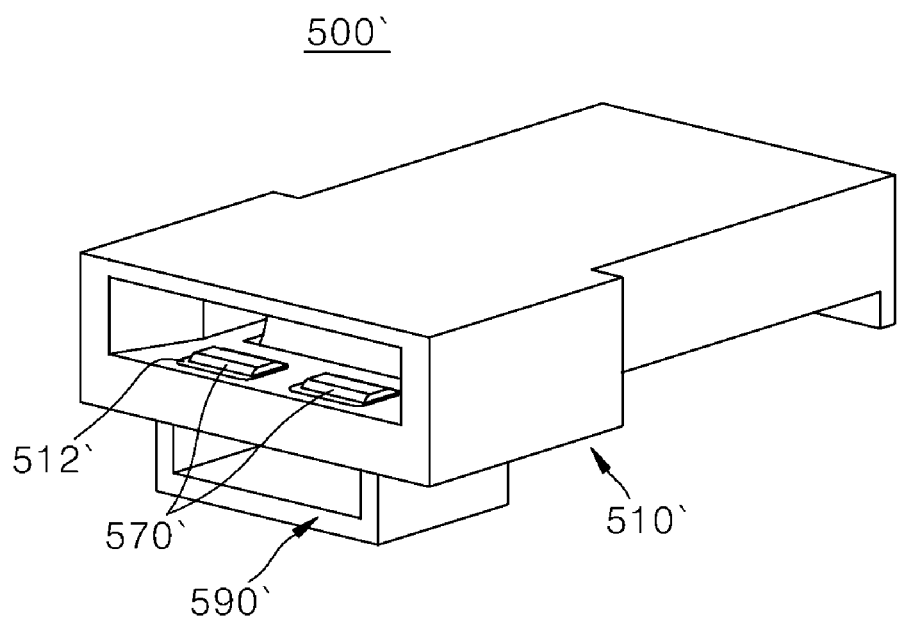
FIG. 14 is an assembled perspective view illustrating a front connector according to a second embodiment of the present disclosure.
Figure 15:
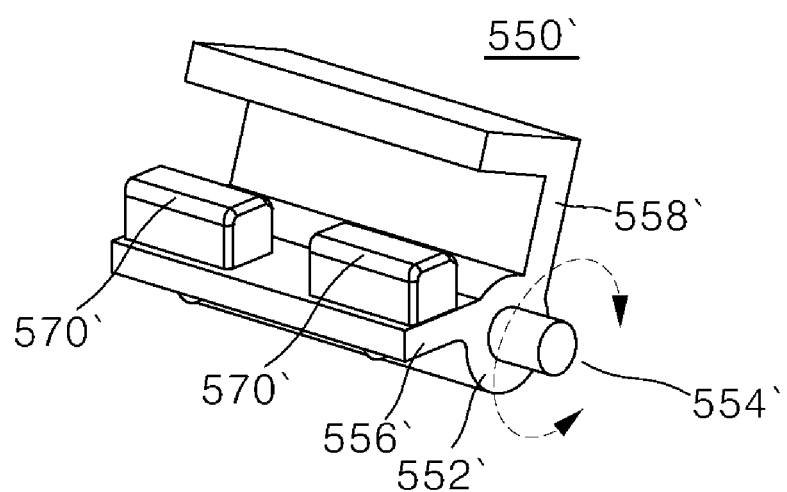
FIG. 15 is a perspective view illustrating main components of the front connector illustrated in FIG. 14.
Figure 16:
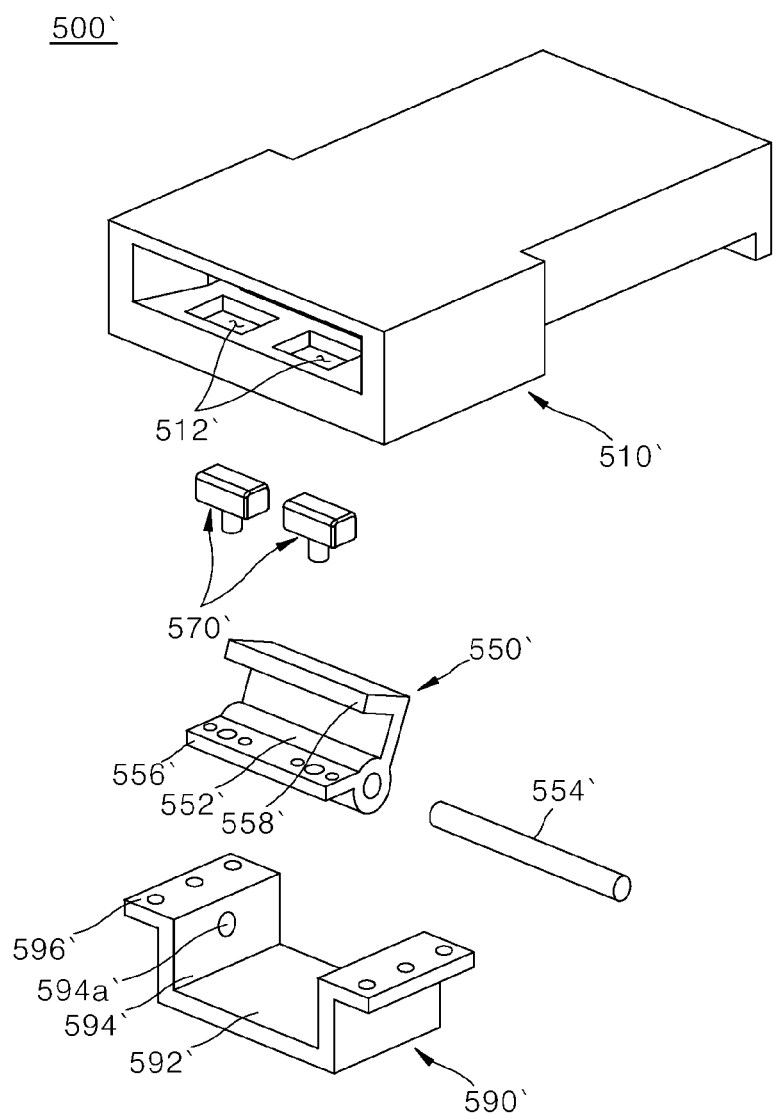
FIG. 16 is an exploded perspective view illustrating the front connector of the cart robot illustrated in FIG. 14.
Figure 17:
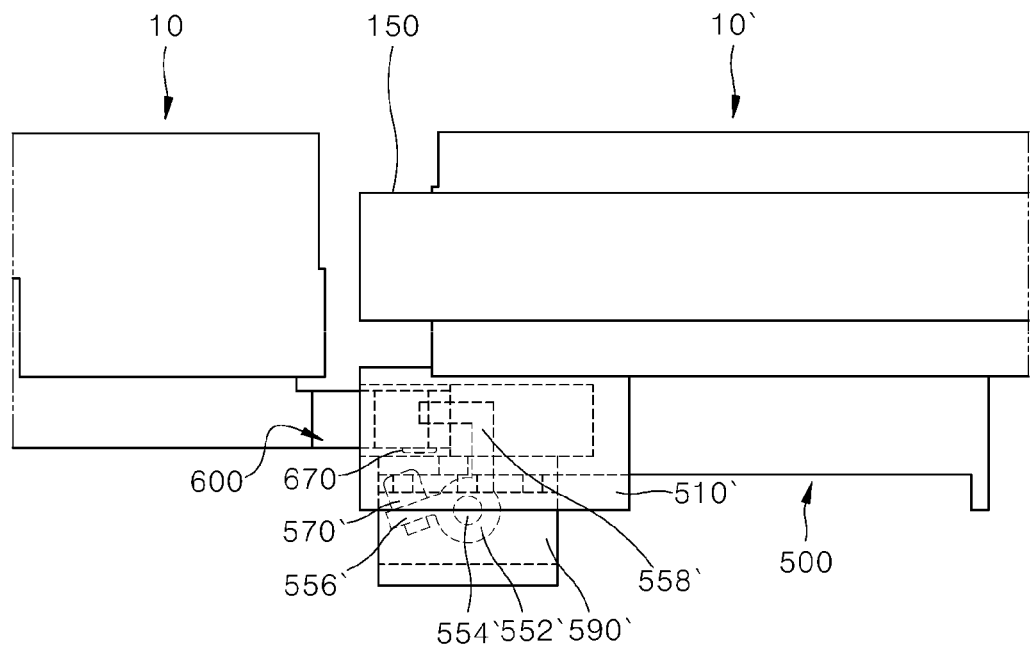
FIG. 17 is a side view illustrating a state before an external charge module is connected when a plurality of cart robots according to the second embodiment of the present disclosure are connected.
Figure 18:
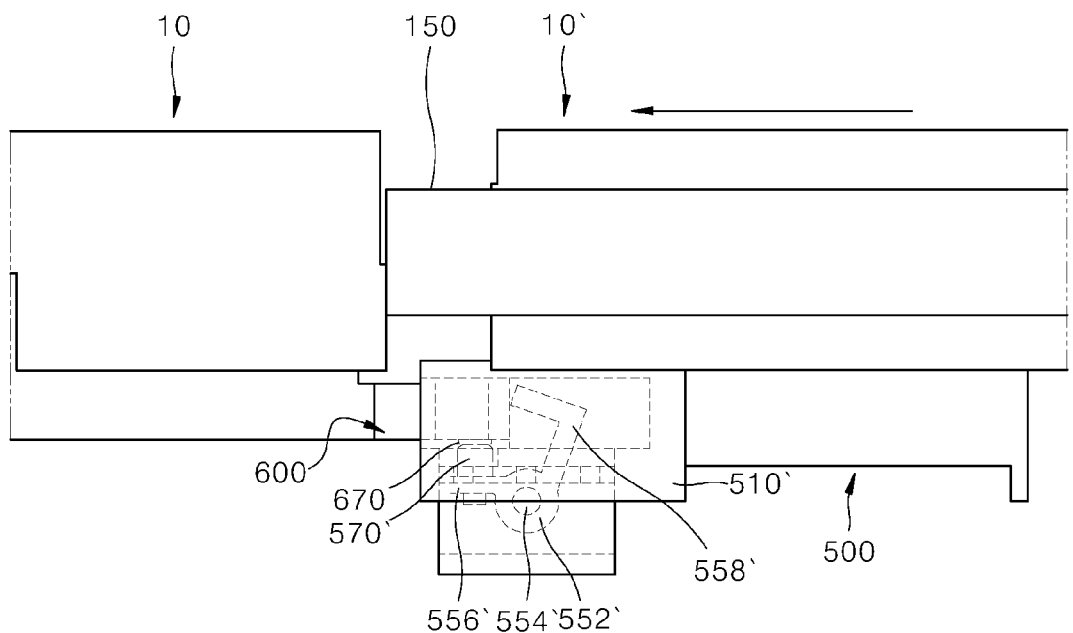
FIG. 18 is a side view illustrating a state after the external charge module illustrated in FIG. 17 is connected.

FIG. 14 is an assembled perspective view illustrating a front connector according to a second embodiment of the present disclosure. FIG. 15 is a perspective view illustrating main components of the front connector illustrated in FIG. 14. FIG. 16 is an exploded perspective view illustrating the front connector of the cart robot illustrated in FIG. 14. FIG. 17 is a side view illustrating a state before an external CM is connected when a plurality of cart robots according to the second embodiment of the present disclosure are connected. FIG. 18 is a side view illustrating a state after the external CM illustrated in FIG. 17 is connected.

As illustrated in FIGS. 14 to 16, a front connector 500 according to a second embodiment of the present disclosure includes a front connecting body 510' in the form of a box having a prescribed size, a connecting lever 550' that rotatably supports terminals 570', and a fastening bracket 590' that couples the connecting lever 550' to the front connecting body 510'.

The front connecting body 510' has an approximate box shape, and an interior thereof may be emptied in whole or in part. The front connecting body 510' is coupled to a front lower side of a cart robot 10. Although not illustrated in the drawings, a coupling structure in which the front connecting body 510' is inserted into a lower portion of a main body 100 of the cart robot 10 may be provided. The front connecting body 510' is open on a front side thereof in such a way that the interior thereof is emptied, and a pair of terminal inserting holes 512' are formed to pass through a lower wall thereof. The connecting lever 550' supporting the terminals 570' is rotatably coupled below the terminal inserting holes 512' by the fastening bracket 590'.

The connecting lever 550' includes a cylindrical rotary support 552' having a hollow, a cylindrical rotary shaft 554' that is inserted into the hollow of the rotary support 552', a terminal coupling 556' that extends to one side of the rotary support 552' in a radial direction, and a rotator 558' that extends to the other side of the rotary support 552' in the radial direction.

A cylindrical hollow corresponding to a size and shape of the rotary shaft 554' is formed in the rotary support 552' in a longitudinal direction, and the rotary shaft 554' is inserted into the cylindrical hollow. The rotary shaft 554' is fixed in the rotary support 552' by a press fit, and opposite ends thereof protrude outward from the rotary support 552'. The protruding opposite ends of the rotary shaft 554' are rotatably coupled to the fastening bracket 590' to be described below.

The terminal coupling 556' is shaped of a plate that is coupled to the pair of terminals 570' and supports the terminals 570'. The terminal coupling 556' supports the terminals 570', and thus is formed to have enough size to support the pair of terminals 570'. Coupling bosses are formed in lower surfaces of the terminals 570' in a projected shape, and are inserted into the terminal coupling 556'. In this state, the terminals 570' may be fixed to the terminal coupling 556' by fastening members such as bolts. Although not illustrated in the drawings, the terminals 570' have the same electrical connection structure as the first terminals 570 and the second terminals 670 of the aforementioned embodiment. The rotator 558' is formed to be spaced at a preset angle apart from the terminal coupling 556'.

The rotator 558' is shaped of a plate that is bent in an "L" shape when viewed from the side. When the front connector 500 is coupled with the rear connector 600 of another cart robot 10', the rotator 558' is pushed toward the rear of the cart robot 10 by the second lower wall 613 of the rear connector 600, and causes the terminal coupling 514 to rotate toward the second terminals 670 of the rear connector 600 while rotating about the rotary shaft 554'.

The fastening bracket 590' is a bracket for installation that has an approximately "C-shaped" cross-section. The fastening bracket 590' includes a quadrilateral lower wall 592', a pair of sidewalls 594' that vertically extend upward from opposite sides of the lower wall 592', and a body coupling 596' that extends outward from the sidewalls 594' to be parallel to the lower wall 592'. Shaft inserting holes 594a' by which the rotary shaft 554' is rotatably supported are formed in the sidewalls 594'.

The fastening bracket 590' is disposed at a lower portion of the terminal inserting holes 512' in such a manner that the shaft inserting holes 594a' rotatably support the rotary shaft 554' and the fastening bracket 590' surrounds the connecting lever 550', and is coupled to the front connecting body 510' by, for example, bolts.

As in FIG. 17, when the front connector 500 is coupled with the rear connector 600 of the other cart robot 10', the rotator 558' rotates the terminal coupling 514 such that the terminals 570' can come into contact with the second terminals 670 while rotating to the rear of the cart robot 10 along with movement of the cart robot 10 (in an arrow direction of FIG. 18).

In contrast, when the cart robot 10 moves away from the other cart robot 10', the rotator 558' can return to the original position thereof (to this end, although not illustrated in the drawings, a spring that elastically supports the rotary shaft may be installed between the rotary shaft and the fastening bracket).

The terminals 570' are not exposed to the terminal inserting holes 613a of the front connecting body 510 before the connecting lever 550' is rotated (see FIG. 17). However, when the connecting lever 550' is rotated, the terminals 570' can come into contact with and be electrically connected to the second terminals 670 provided on the rear connector 600 of the other cart robot 10' while being exposed to the terminal inserting holes 613a.

Meanwhile, a coupling position of the external CM according to the embodiments of the present disclosure may be guided such that the external CM can be easily coupled with the external CM of the other cart robot at a charge position by a cart robot guider.

Figure 19:
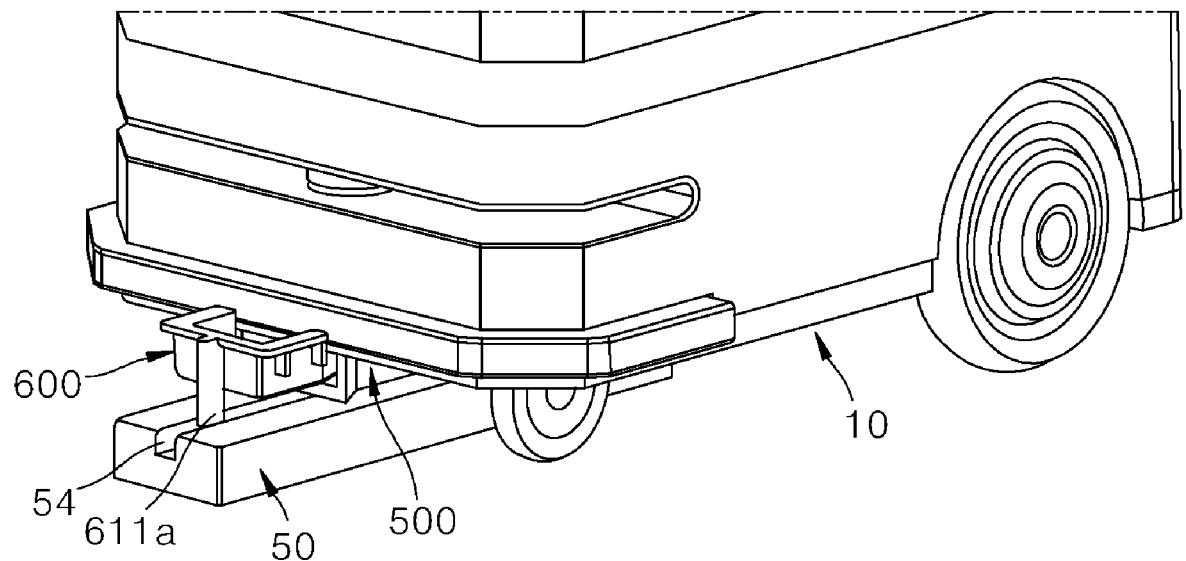
FIG. 19 is a partially perspective view illustrating an example of a fixed state of the front connector at a charge position of the cart robot according to the embodiments of the present disclosure.
Figure 20:
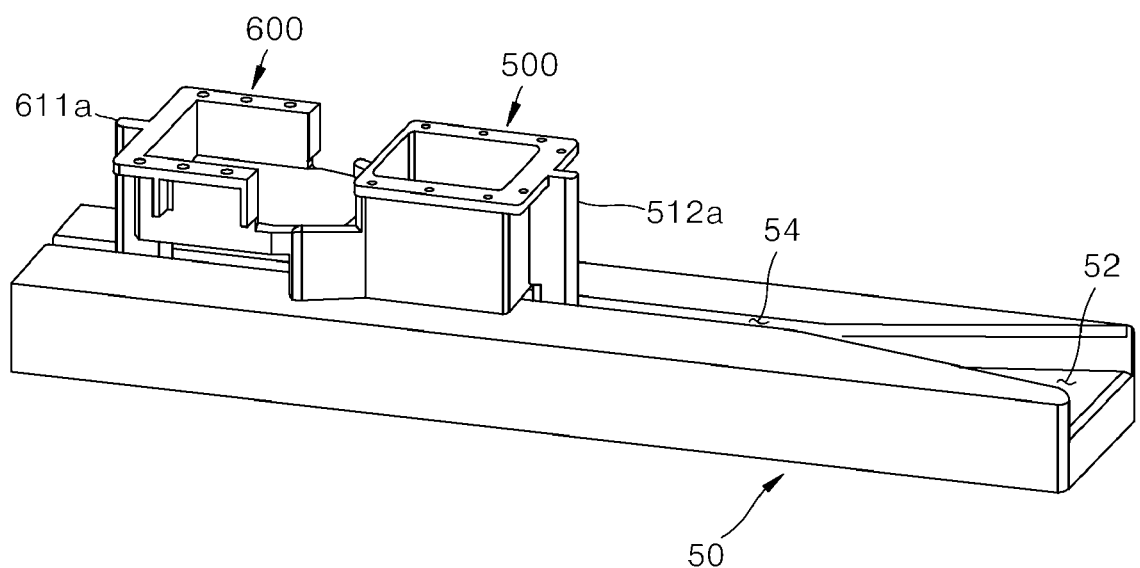
FIG. 20 is a partially perspective view illustrating a connected state of the external charge module when a plurality of cart robots are connected at a charge position of the cart robot according to the embodiments of the present disclosure.

FIG. 19 is a partially perspective view illustrating an example of a fixed state of the front connector at a charge position of the cart robot according to the embodiments of the present disclosure. FIG. 20 is a partially perspective view illustrating a connected state of the external CM when a plurality of cart robots are connected at a charge position of the cart robot according to the embodiments of the present disclosure.

As illustrated in FIGS. 19 and 20, a cart robot guider 50 is a kind of guide rail that guides a position of the cart robot 10 during the movement thereof. The cart robot guider 50 may include a guide 52 that guides an insertion position of the first guide rib 512a provided on the front connector 500 of the cart robot 10, and a guide rail 54 that is connected to the guide 52 and forms a movement path of the first guide rib 512a. The cart robot guider 50 may be installed on the floor at a charge position, and a length thereof may be changed according to the maximum number of the cart robots 10 that can be disposed at a charge position.

The guide 52 is a kind of groove whose width is narrowed from an end, which the front connector 500 enters, toward the inside. The width of the guide 52 is wide at a portion which the front connector 500 enters, and is gradually narrowed toward the inside thereof, so that it becomes equal to a width of the guide rail 54. Therefore, as long as the front connector 500 enters the guide 52 even if the cart robot 10 is not moved with a position of the front connector 500 exactly fitted, the first guide rib 512a is moved along the guide rail 54, so that the cart robot 10 can be guided to the front cart robot 10 or the charger 30.

The guide rail 54 is disposed to correspond to a position of a connector provided on the power supply or the charger 30, and guides the front connector 500 of the cart robot 10 such that the front connector 500 of the cart robot 10 can be directly connected to the connector of the power supply or the charger 30 when moved along the guide rail 54.

Further, since the front connector 500 and the rear connector 600 of each cart robot 10 are disposed on a straight line, when the first guide rib 512a of the front connector 500 moves along the guide rail 54, the second guide rib 611a of the rear connector 600 is also moved along the guide rail 54. Therefore, there is an advantage in that the external CM is easily connected between the cart robots 10 and the external CM is easily coupled at a charge position.

The external CM has a structure in which, even if the coupled positions of the front connector 500 and the rear connector 600 are accurately aligned, the front connector 500 and the rear connector 600 can be coupled. Further, even if the position of the cart robot 10 is not accurately adjusted at a charge position by the cart robot guider 50, the coupled positions of the front connector 500 and the rear connector 600 are guided such that the front connector 500 and the rear connector 600 of each cart robot 10 can be easily coupled. Therefore, there is an effect in that convenience of a user is improved and the terminals are accurately connected at the time of charge.

The cart robot of the present disclosure can be variously used in a commercial field, a leisure field, a logistics field, and so on.

While various embodiments have been described above, it will be understood to those skilled in the art that the embodiments described are by way of example only. Accordingly, the disclosure described herein should not be limited based on the described embodiments.

The invention claimed is:

1. A cart robot comprising:
a main body including:
   a container to store goods;
   a handle assembly located at a first side of the container;
   a battery module; and
   a battery management system (BMS) configured to control charging and discharging of the battery module;
a wheel assembly coupled to the main body, the wheel assembly being configured to move the main body in a direction of a force applied to the handle assembly; and
an external charge module including:
   a front connector provided at a lower front side of the main body, the front connector being one of a female connector or a male connector; and
   a rear connector provided at a lower rear side of the main body, the rear connector being another one of a female connector or a male connector,
wherein the external charge module is electrically connectable to an external power supply through the front connector or the rear connector to charge the battery module, and
wherein the front connector further includes:
   a front connecting body coupled to the main body; and
   a first guide rib provided on a first side of the front connecting body.

2. The cart robot according to claim 1, wherein the cart robot is a first cart robot, and the front connector of the first cart robot is configured to be disposed toward a rear connector of a second cart robot when the first cart robot is coupled with the second cart robot, and
wherein the front connector of the first cart robot includes:
   a first terminal energized when the external power supply is activated; and
   a first spring configured to elastically support the first terminal toward the rear connector of the second cart robot.

3. The cart robot according to claim 2, wherein the rear connector of the first cart robot is disposed toward a front connector of a third cart robot when the first cart robot is coupled with the third cart robot, and
wherein the rear connector of the first cart robot includes:
   a second terminal energized when the external power supply is activated; and
   a second spring configured to elastically support the second terminal toward the front connector of the third cart robot.

4. The cart robot according to claim 3, wherein the front connector of the first cart robot is configured to contact the rear connector of the second cart robot when the first cart robot is coupled with the second cart robot, and
wherein the rear connector of the first cart robot is configured to contact the front connector of the third cart robot when the first cart robot is coupled with the third cart robot.

5. The cart robot according to claim 1, wherein the rear connector further includes:
   a rear connecting body coupled to the main body; and
   a second guide rib provided on a first side of the rear connecting body.

6. The cart robot according to claim 5, wherein the first guide rib and the second guide rib are configured to extend into a guide rail of a cart robot guider installed on a floor, and
   wherein the first guide rib and the second guide rib are configured to move along the guide rail.

7. The cart robot according to claim 5, wherein the front connecting body includes a first magnet,
   wherein the rear connecting body includes a second magnet, and
   wherein the first magnet and the second magnet have opposing magnetic poles.

8. The cart robot according to claim 1, wherein the front connector further includes:
   a terminal configured to be energized when the external power supply is activated; and a connecting lever fixed to a lower portion of the front connecting body and configured to rotatably support the terminal.

9. The cart robot according to claim 8, wherein the front connecting body further includes a terminal inserting hole, and wherein the terminal is provided in the terminal inserting hole.

10. The cart robot according to claim 9, wherein the connecting lever includes:

a cylindrical rotary support having a hollow portion;
a cylindrical rotary shaft provided in the hollow portion;
a terminal coupling extending from a first side of the cylindrical rotary support in a radial direction and coupled to the terminal; and
a rotator extending from a second side of the cylindrical rotary support in the radial direction.

11. The cart robot according to claim 10, wherein the rotator of the connecting lever is bent toward a front of the main body in an "L" shape, and is configured to:

rotate to face a rear of the main body by a rear connector of a second cart robot when the cart robot is coupled with the second cart robot, and
rotate about the rotary shaft to expose the terminal to the terminal inserting hole.

12. The cart robot according to claim 1, wherein the main body comprises:

a sensor configured either to detect a position of a user or detect a force applied to the handle by the user; and
a main printed circuit board (PCB) module having a main PCB configured to communicate with the BMS.

13. The cart robot according to claim 12, wherein the main body further includes a bumper for protecting the main PCB module and the sensor, the bumper surrounding a portion of the main body.

14. The cart robot according to claim 13, wherein the bumper is located at the lower front side of the main body, and is made of an elastic material having a preset thickness.

15. The cart robot according to claim 1, wherein the wheel assembly comprises an in-wheel motor to be supplied with power from the battery module and configured to provide an auxiliary force to the wheel assembly.

16. The cart robot according to claim 1, wherein the battery module includes:

a battery;
a battery case configured to house the battery; and
a printed circuit board (PCB) for the battery, and
wherein the battery is detachably coupled to the battery case.

17. The cart robot according to claim 16, wherein the PCB for the battery communicates with the BMS, and wherein the BMS is provided on the PCB or the battery module.

18. The cart robot according to claim 17, wherein the cart robot is a first cart robot, and the BMS of the first cart robot is configured to:

determine a charge amount and a discharge amount of the battery of the first cart robot to calculate a residual amount and an operable time of the battery of the first cart robot, and
determine a time required to charge of the battery of the first cart robot, and perform control by distinguishing when the battery of the first cart robot is in an operation mode and when the battery of the first cart robot is in a charge mode and by determining whether the first cart robot is disposed at a charge position for charging or is connected to a second cart robot.

19. The cart robot according to claim 18, wherein the BMS of the first cart robot is configured to communicate with a main PCB of the first cart robot, wherein the BMS of the first cart robot is configured to communicate with a BMS of the second cart robot, and
wherein the BMS of the first cart robot is configured to determine, according to the residual amount of charge of the battery of the first cart robot in the charge mode, whether to preferentially charge the battery of the first cart robot or to transmit power to the second cart robot in order to preferentially charge a battery of the second cart robot.

* * * * *